(12) United States Patent
Lee et al.

(10) Patent No.: US 12,357,859 B2
(45) Date of Patent: Jul. 15, 2025

(54) BATTERY PACK COMPRISING FIRE EXTINGUISHING UNIT, BATTERY RACK COMPRISING SAME, AND POWER STORAGE SYSTEM

(71) Applicant: LG ENERGY SOLUTION, LTD., Seoul (KR)

(72) Inventors: Jin-Kyu Lee, Daejeon (KR); Goan-Su Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 558 days.

(21) Appl. No.: 17/780,676

(22) PCT Filed: Jan. 12, 2021

(86) PCT No.: PCT/KR2021/000412
§ 371 (c)(1),
(2) Date: May 27, 2022

(87) PCT Pub. No.: WO2021/153926
PCT Pub. Date: Aug. 5, 2021

(65) Prior Publication Data
US 2024/0024714 A1    Jan. 25, 2024

(30) Foreign Application Priority Data
Jan. 30, 2020    (KR) .................. 10-2020-0011324

(51) Int. Cl.
*A62C 3/16*    (2006.01)
*A62C 35/13*    (2006.01)
*A62C 37/44*    (2006.01)

(52) U.S. Cl.
CPC ............... *A62C 3/16* (2013.01); *A62C 35/13* (2013.01); *A62C 37/44* (2013.01)

(58) Field of Classification Search
CPC ............ A62C 3/16; A62C 37/44; A62C 35/13
(Continued)

(56) References Cited

U.S. PATENT DOCUMENTS

2012/0312562 A1    12/2012    Woelite et al.
2017/0043194 A1*    2/2017    Ling ..................... A62C 37/08
(Continued)

FOREIGN PATENT DOCUMENTS

CN    107398049 A    11/2017
JP    9-239061 A    9/1997
(Continued)

OTHER PUBLICATIONS

International Search Report (PCT/ISA/210) issued in PCT/KR2021/000412 mailed on Apr. 19, 2021.
(Continued)

*Primary Examiner* — Cody J Lieuwen
(74) *Attorney, Agent, or Firm* — Birch, Stewart, Kolasch & Birch, LLP

(57) ABSTRACT

A battery pack includes at least one battery module; a first fire extinguisher including a first fire detection sensor, a first fire extinguishing tank configured to accommodate a fire extinguishing agent therein, a first pipe configured to connect the first fire extinguishing tank and the at least one battery module so that the fire extinguishing agent is supplied from the first fire extinguishing tank to the at least one battery module, and a first valve opened to supply the fire extinguishing agent from the first fire extinguishing tank to the at least one battery module; and a second fire extinguisher including a second fire detection sensor, a second pipe having one end connected to the first pipe, a fire extinguishing agent supplier connected to the other end of the second pipe, and a second valve opened to supply the fire extinguishing agent to the first pipe through the second pipe.

15 Claims, 10 Drawing Sheets

(58) Field of Classification Search
USPC .......................................................... 169/61
See application file for complete search history.

(56) References Cited

U.S. PATENT DOCUMENTS

| | | | |
|---|---|---|---|
| 2018/0289996 A1* | 10/2018 | Kim | A62C 37/04 |
| 2019/0046820 A1 | 2/2019 | Lee et al. | |
| 2020/0197735 A1* | 6/2020 | Li | A62C 37/44 |
| 2021/0086009 A1* | 3/2021 | Rogers | A62C 3/08 |

FOREIGN PATENT DOCUMENTS

| | | |
|---|---|---|
| JP | 2013-500801 A | 1/2013 |
| JP | 2017-147128 A | 8/2017 |
| KR | 10-1390581 B1 | 4/2014 |
| KR | 20-2016-0001569 U | 5/2016 |
| KR | 10-1706717 B1 | 3/2017 |
| KR | 10-1710949 B1 | 3/2017 |
| KR | 10-2018-0032122 A | 3/2018 |
| KR | 10-2018-0092521 A | 8/2018 |
| KR | 10-2019-0075737 A | 7/2019 |
| KR | 10-1998279 B1 | 7/2019 |
| KR | 10-2050803 B1 | 12/2019 |
| WO | WO 2010/025761 A1 | 3/2010 |

OTHER PUBLICATIONS

Extended Europeaan Search Report for European Application No. 21746938.6, dated Dec. 20, 2023.

* cited by examiner

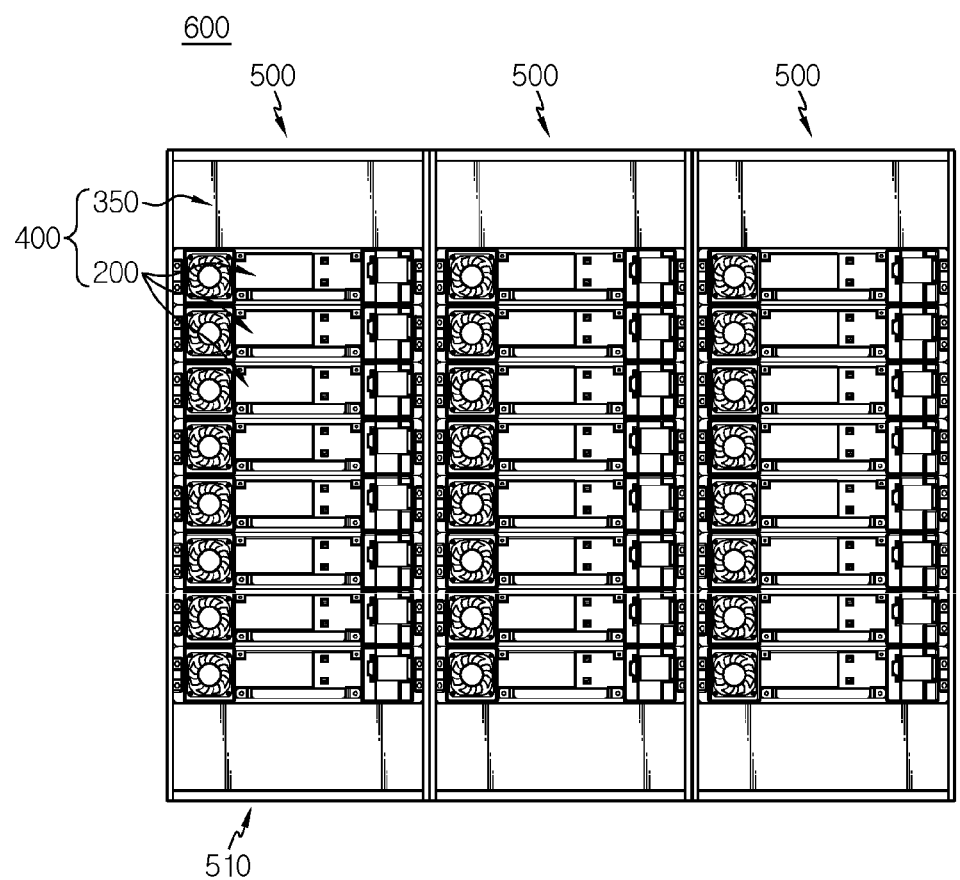

BATTERY PACK COMPRISING FIRE EXTINGUISHING UNIT, BATTERY RACK COMPRISING SAME, AND POWER STORAGE SYSTEM

TECHNICAL FIELD

The present disclosure relates to a battery pack including a fire extinguishing unit, and a battery pack and an energy storage system including the battery pack, and more particularly, to a battery pack having a reduced risk of secondary ignition or explosion.

The present application claims priority to Korean Patent Application No. 10-2020-0011324 filed on Jan. 30, 2020 in the Republic of Korea, the disclosures of which are incorporated herein by reference.

BACKGROUND ART

Secondary batteries commercialized at the present include nickel cadmium batteries, nickel hydrogen batteries, nickel zinc batteries, and lithium secondary batteries. Among them, lithium secondary batteries are in the spotlight due to free advantages such as free charging and discharging by little memory effect compared to nickel-based secondary batteries, and very low self-discharge rate and high energy density.

The lithium secondary battery mainly uses a lithium-based oxide and a carbon material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed therebetween, and an exterior, namely a battery pouch exterior, for hermetically storing the electrode assembly together with an electrolyte.

Recently, secondary batteries are widely used not only in small devices such as portable electronic devices, but also in middle-sized or large-sized devices such as vehicles and energy storage systems. When used in the middle-sized or large-sized device, a large number of secondary batteries are electrically connected to increase capacity and output. In particular, pouch-type secondary batteries are widely used in the middle-sized or large-sized devices since they may be easily stacked.

Meanwhile, recently, as the need for a large-capacity structure increases along with the use as an energy storage source, the demand for a battery pack including a plurality of secondary batteries electrically connected in series and/or in parallel, and a battery module accommodating the secondary batteries therein, and a battery management system (BMS) is increasing.

In addition, the battery pack generally includes an outer housing made of a metal material to protect or store the plurality of secondary batteries from an external shock. Meanwhile, the demand for high-capacity battery packs is increasing recently.

However, since the conventional battery pack or the conventional battery rack has a plurality of battery modules, if the secondary batteries of each battery module generates thermal runaway to cause ignition or explosion, heat or flame may be transferred to neighboring secondary batteries to cause secondary explosions, so efforts to prevent secondary ignition or explosion are increasing.

Accordingly, it is necessary to develop a fast and complete fire extinguishing technology to take immediate action when thermal runaway occurs in some secondary batteries in the battery pack or the battery rack. In addition, there is a need for an alternative method for extinguishing fire in case the battery management system for controlling whether or not to perform fire extinguishing for fire suppression is inoperative or malfunctions when fire occurs at battery modules.

DISCLOSURE

Technical Problem

The present disclosure is designed to solve the problems of the related art, and therefore the present disclosure is directed to providing a battery pack, which reduces the risk of secondary ignition or explosion.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:
  at least one battery module;
  a first fire extinguisher including a first fire detection sensor configured to detect that a temperature of the at least one battery module rises over a first predetermined temperature or smoke is generated at the at least one battery module, a first fire extinguishing tank configured to accommodate a fire extinguishing agent therein, a first pipe configured to connect the first fire extinguishing tank and the at least one battery module so that the fire extinguishing agent is supplied from the first fire extinguishing tank to the at least one battery module, and a first valve provided to the first pipe and configured to be opened to supply the fire extinguishing agent from the first fire extinguishing tank to the at least one battery module when the temperature of the at least one battery module rises over the predetermined temperature or smoke is generated at the at least one battery module; and
  a second fire extinguisher including a second fire detection sensor configured to detect that the temperature of the at least one battery module rises over a second predetermined temperature or smoke is generated at the at least one battery module, a second pipe having a first one end connected to the first pipe, a fire extinguishing agent supplier connected to a second end of the second pipe so that a second fire extinguishing agent is supplied to the first pipe through the second pipe, and a second valve configured to be opened to supply the second fire extinguishing agent from the fire extinguishing agent supplier to the first pipe through the second pipe when the temperature of the at least one battery module rises over the second predetermined temperature or smoke is generated at the at least one battery module.

Also, the fire extinguishing agent supplier may include a second fire extinguishing tank configured to accommodate the second fire extinguishing agent therein, or a fire plug connected to the second pipe and configured to supply water from the outside, or both of the second fire extinguishing tank and the fire plug.

Moreover, the first fire extinguisher may further include a first control unit configured to control the first valve to be opened or closed according to a signal received from the first fire detection sensor, the second fire extinguisher may further include a second control unit configured to control the second valve to be opened or closed according to a signal received from the second fire detection sensor, the first control unit may transmit a fire signal to the second control unit, when receiving the fire signal from the first fire detection sensor, and the second control unit may be configured to open the second valve, when the second fire detection sensor detects that the battery module is kept over the predetermined temperature even through a predetermined time passes after receiving the fire signal from the first control unit.

In addition, the at least one battery module comprises at least two battery modules the at least one battery module comprises at least two battery modules, the first pipe may include:

a common pipe connected to an outlet hole of the first fire extinguishing tank through which the first fire extinguishing agent is discharged; and a distribution pipe having a distributed structure connected to each of the at least two battery modules from the common pipe, the first valve may be located at a portion of the common pipe to open or close the common pipe, and the first valve may be an active valve controlled to be opened or closed by the first control unit.

Further, the first fire extinguisher may further include a distribution valve located at a portion of the distribution pipe to open or close the distribution pipe, and the distribution valve may be a passive valve configured to open an output hole thereof by deforming an inner configuration thereof partially when the temperature of the battery module rises over the first predetermined temperature.

Also, the distribution valve may include:

a glass bulb configured to close the output hole and configured to open the output hole by being at least partially broken when the battery module is exposed to an internal gas over the first predetermined temperature; and a disperser configured to disperse the first fire extinguishing agent discharged from the output hole.

In addition, the battery module may include at least one cell assembly having a plurality of secondary batteries, and a module housing having an inner space capable of accommodating the at least one cell assembly, the module housing may have a gas passage configured to discharge gas generated from the at least one cell assembly to the outside, and the glass bulb of the distribution valve may be located at a portion of the gas passage.

Further, the distribution valve may further include a gas guide configured to guide gas generated from the at least one cell assembly to come into contact with the glass bulb.

Also, in another aspect of the present disclosure, there is also provided a battery rack, comprising: a battery pack; and a rack case configured to accommodate the battery pack.

Moreover, in another aspect of the present disclosure, there is also provided an energy storage system, comprising two or more battery racks.

Advantageous Effects

According to an embodiment of the present disclosure, since the battery pack of the present disclosure further includes the second fire extinguishing unit separately from the first fire extinguishing unit, even though the fire of the battery module is not extinguished through the first fire extinguishing unit due to a failure or malfunction of the first fire extinguishing unit, the fire may be extinguished additionally using the separate second fire extinguishing unit. Accordingly, the battery module of the present disclosure may maximize safety through double fire extinguishing.

Also, according to an embodiment of the present disclosure, since the first fire extinguishing unit further includes a first control unit configured to control the first valve to be opened or closed according to a signal received from the first fire detection sensor and the second fire extinguishing unit further includes a second control unit configured to control the second valve to be opened or closed according to a signal received from the second fire detection sensor, when a fire or thermal runaway occurs at the battery module, even though the first valve cannot be opened or closed due to a malfunction or failure of the first control unit, the second control unit may open the second valve, thereby securing reliable fire extinguishing.

Moreover, according to an embodiment of the present disclosure, since the distribution valve of the present disclosure includes a glass bulb configured to seal the output hole, but configured to open the output hole as being partially broken when being exposed to the internal gas of the battery module over the predetermined temperature, and a dispersion unit configured to disperse the fire extinguishing agent discharged from the output hole, it is possible to open the distribution valve at a response speed by the high internal temperature of the battery module at which thermal runaway or fire occurs. Moreover, since the dispersion unit evenly sprays the supplied fire extinguishing agent, the extinguishing ability may be effectively increased.

Further, according to an embodiment of the present disclosure, since the dispersion unit of the distribution valve according to the present disclosure includes the gas guide extending from the top portion toward the dispersion unit and having a structure that is widened in at least two of left, right, upper and lower directions, the high-temperature gas flowing to both sides of the glass bulb may be guided to flow toward the glass bulb without passing directly. Accordingly, the distribution valve may operate with high reliability, and the operating time of the distribution valve may be effectively reduced.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 12 is a front view schematically showing an energy storage system according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
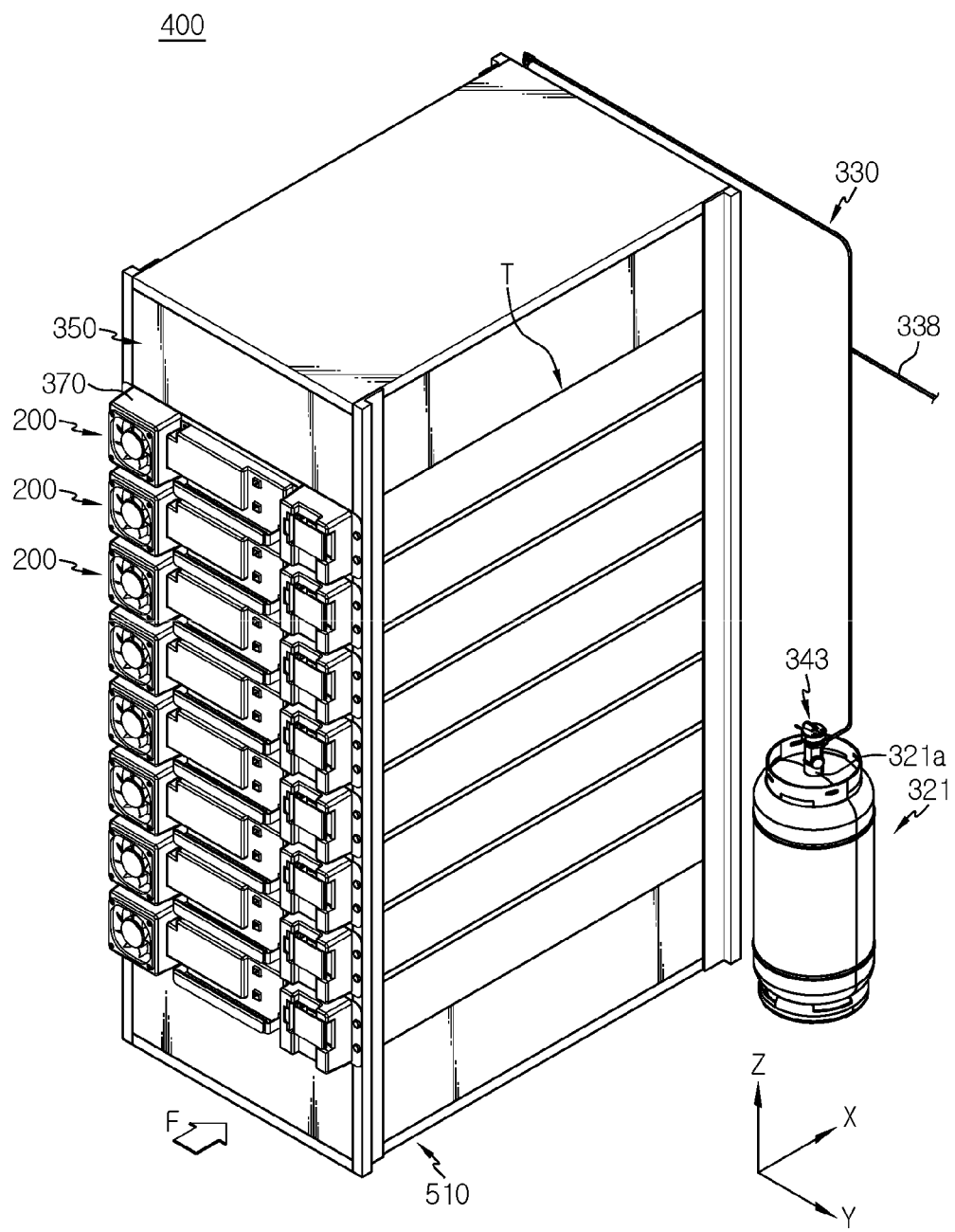
FIG. 1 is a front perspective view schematically showing a battery pack according to an embodiment of the present disclosure.
Figure 2:
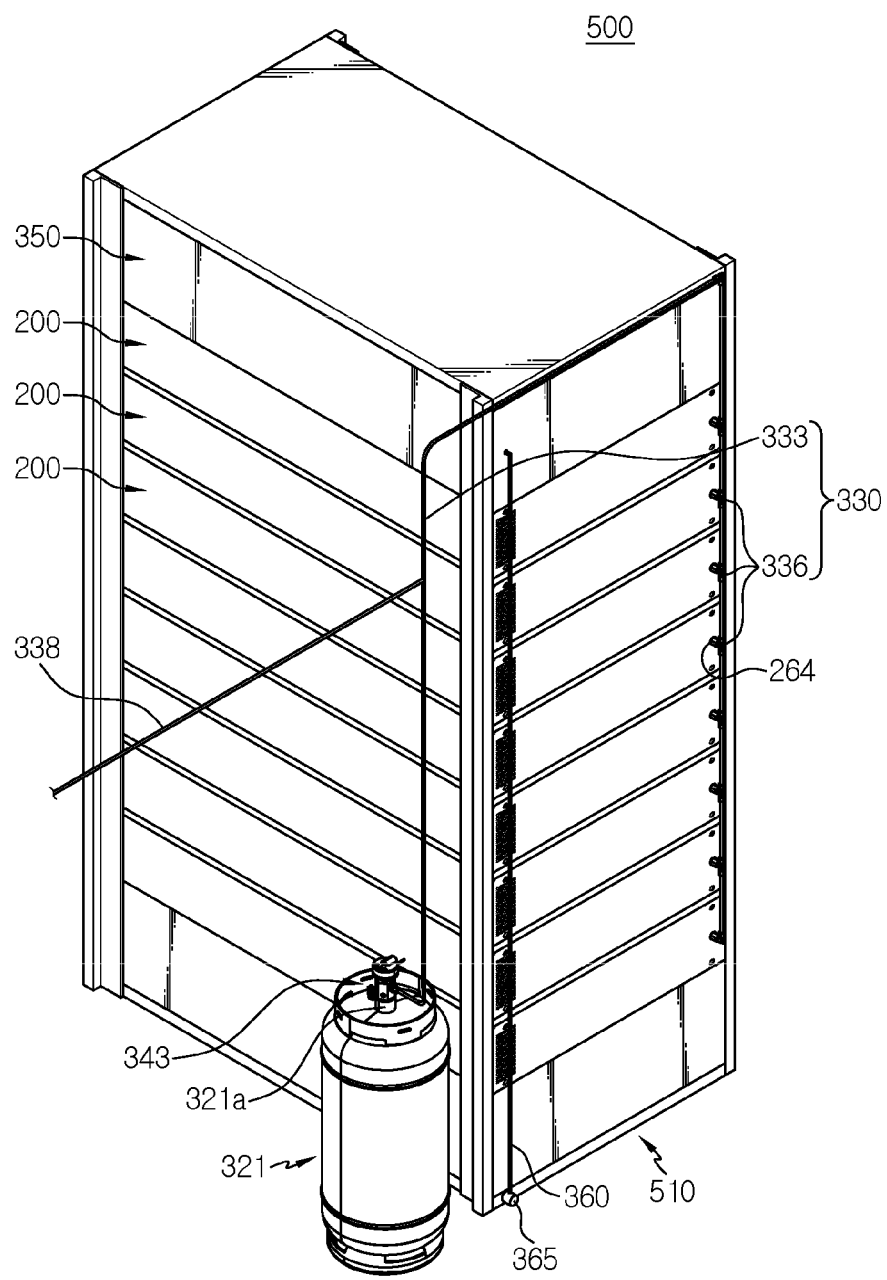
FIG. 2 is a rear perspective view schematically showing the battery pack according to an embodiment of the present disclosure.
Figure 3:
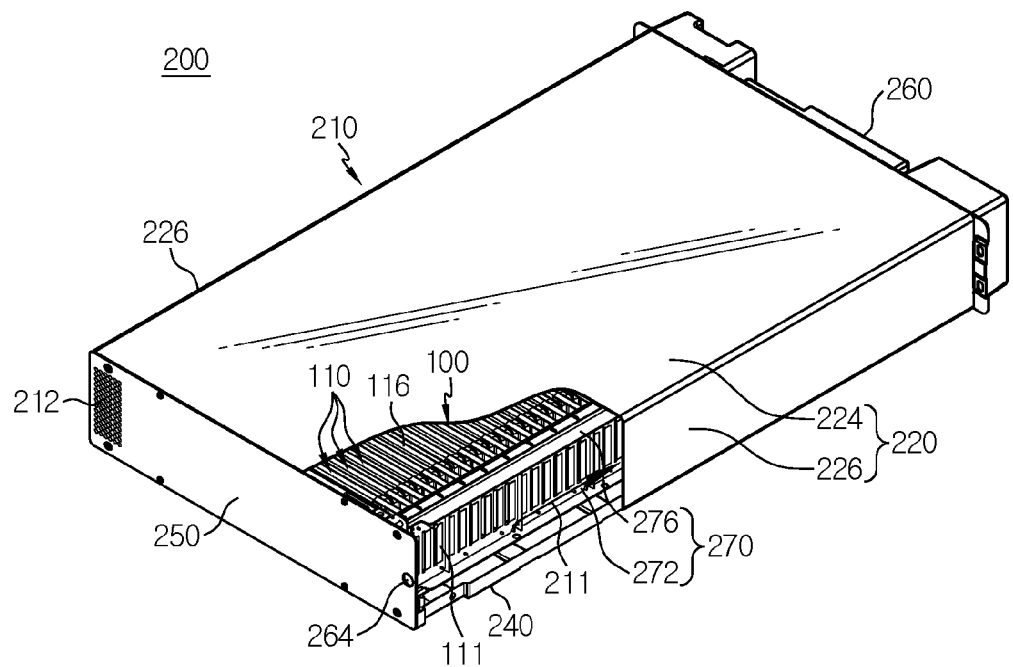
FIG. 3 is a rear perspective view schematically showing a battery module, employed at the battery pack according to an embodiment of the present disclosure.
Figure 4:
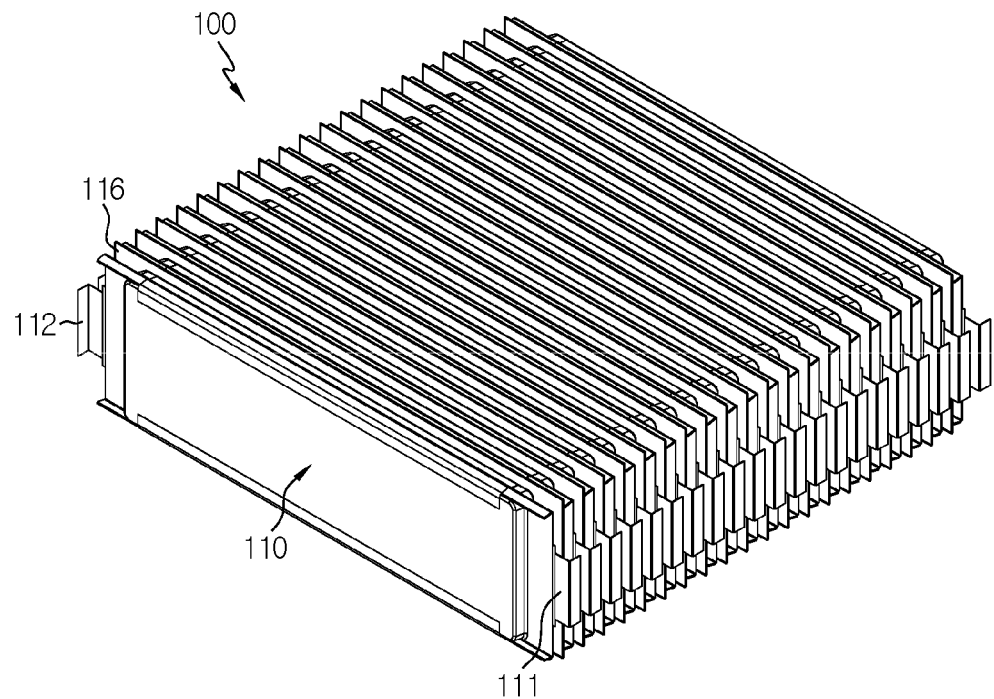
FIG. 4 is a perspective view schematically showing a cell assembly, employed at the battery pack according to an embodiment of the present disclosure.
Figure 5:
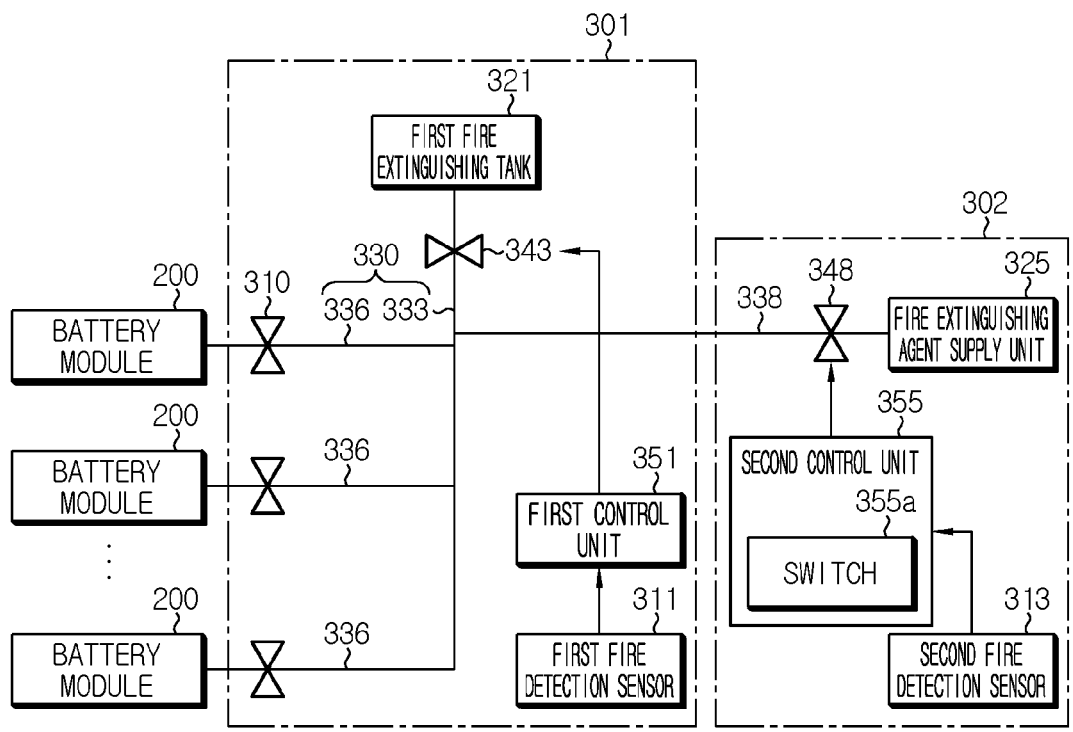
FIG. 5 is a conceptual diagram schematically showing components of the battery pack according to an embodiment of the present disclosure.

FIG. 1 is a front perspective view schematically showing a battery pack according to an embodiment of the present disclosure. FIG. 2 is a rear perspective view schematically showing the battery pack according to an embodiment of the present disclosure. FIG. 3 is a rear perspective view schematically showing a battery module, employed at the battery pack according to an embodiment of the present disclosure. FIG. 4 is a perspective view schematically showing a cell assembly, employed at the battery pack according to an embodiment of the present disclosure. Also, FIG. 5 is a conceptual diagram schematically showing components of the battery pack according to an embodiment of the present disclosure. In addition, in FIG. 1, a positive direction of an X-axis arrow refers to a rear direction, a negative direction thereof refers to a front direction, a positive direction of a Y-axis arrow refers to a left direction, a negative direction thereof refers to a right direction, and a positive direction of a Z-axis direction refers to an upper direction, and a negative direction thereof refers to a lower direction.

Referring to FIGS. 1 to 5, a battery pack 400 of the present disclosure includes at least one battery module 200, a first fire extinguishing unit 301, and a second fire extinguishing unit 302.

First, if a plurality of battery modules 200 are provided, the plurality of battery modules 200 may be arranged in one direction. In this case, the battery module 200 may include at least one cell assembly 100 (FIG. 4). The cell assembly 100 may have a plurality of secondary batteries 110 arranged in one direction.

Also, the secondary battery 110 may be a pouch-type secondary battery 110. For example, as shown in FIG. 4, when viewed in the F direction of FIG. 1 (from the front), the cell assembly 100 may be configured such that a plurality of pouch-type secondary batteries 110 are stacked side by side in the front and rear direction. For example, as shown in FIG. 4, one cell assembly 100 may include 21 pouch-type secondary batteries 110.

Meanwhile, in this specification, unless otherwise specified, the upper, lower, front, rear, left and right directions will be set based on when viewed in the F direction.

In particular, the pouch-type secondary battery 110 may include an electrode assembly (not shown), an electrolyte solution (not shown), and a pouch 116.

Moreover, a positive electrode lead 111 and a negative electrode lead 112 may be formed at left and right ends of the secondary battery 110, which are opposite to each other based on the center of the secondary battery 110. That is, the positive electrode lead 111 may be provided at one end (right end) of the secondary battery 110 based on the center thereof. In addition, the negative electrode lead may be provided at the other end (left end) of the secondary battery 110 based on the center thereof.

However, the battery module 200 according to the present disclosure is not limited to the pouch-type secondary battery 110 described above, and various kinds of secondary batteries 110 known at the time of filing of this application may be employed.

In addition, the battery module 200 may include a cooling fan 370 for injecting an external air to the inside.

Meanwhile, referring to FIG. 4 again, the battery module 200 may further include a bus bar assembly 270. Specifically, the bus bar assembly 270 may include at least one bus bar 272 configured to electrically connect the plurality of secondary batteries 110 to each other and at least two bus bar frame 276 configured to mount the at least at least one bus bar 272 at an outer side. The at least two bus bar frame 276 may be provided at left and right sides of the cell assembly 100, respectively.

Meanwhile, the module housing 210 may have an inner space to accommodate the cell assembly 100 therein. Specifically, when viewed directly in the F direction of FIG. 1, the module housing 210 may include an upper cover 220, a base plate 240, a front cover 260, and a rear cover 250.

Specifically, the base plate 240 may have an area larger than the size of a bottom surface of the at least two cell assemblies 100 so as to mount the at least two cell assemblies 100 to an upper portion thereof. The base plate 240 may have a plate shape extending in a horizontal direction.

In addition, the upper cover 220 may include an upper wall 224 and a sidewall 226 extending downward from the upper wall 224. The upper wall 224 may have a plate shape extending in a horizontal direction to cover an upper portion of the cell assembly 100. The sidewall 226 may have a plate shape extending downward from both left and right ends of the upper wall 224 to cover both left and right sides of the cell assembly 100.

In addition, the sidewall 226 may be coupled to a portion of the base plate 240. For example, as shown in FIG. 3, the upper cover 220 may include an upper wall 224 having a plate shape extending in the front, rear, left and right directions. The upper cover 220 may include two sidewalls 226 extending downward from both left and right ends of the upper wall 224, respectively. Further, lower ends of the two sidewalls 226 may be configured to be coupled with both left and right ends of the base plate 240, respectively. In this case, the coupling method may be a male and female coupling method or a welding method.

Moreover, the front cover 260 may be configured to cover the front side of the plurality of secondary batteries 110. For example, the front cover 260 may include a plate larger than the size of the front surface of the plurality of secondary batteries 110. The plate may be erected in a vertical direction.

In addition, the rear cover 250 may be configured to cover the rear side of the cell assembly 100. For example, the rear cover 250 may have a plate shape larger than the size of the rear surface of the plurality of secondary batteries 110.

In addition, the module housing 210 may include a gas passage 211 located inside the module housing 210 and configured to discharge the gas generated from the cell assembly 100 to the outside. That is, the module housing 210 may have a gas passage 211 through which the gas generated from the cell assembly 100 flows. Here, the gas passage 211 may be a space elongated in the front and rear direction to communicate with the outside. The gas passage 211 may be provided at one of the left and right sides or both left and right sides of the cell assembly 100.

Moreover, the gas passage 211 may be a space between the upper or lower portion of the cell assembly 100 and the module housing 210. That is, the gas generated from the cell assembly 100 accommodated in the battery module 200 may move to both left and right sides of the cell assembly 100 through the gas passage 211 located at the upper or lower portion of the cell assembly 100 and be discharged out through a plurality of gas discharge holes 212 formed at the end of the gas passage 211 and perforated to communicate with the outside of the battery module 200.

In addition, an inlet hole 264 may be provided at the rear cover 250 located at the rear side of each of the at least two battery modules 200 so that the fire extinguishing agent is introduced therethrough. The inlet hole 264 may be positioned to communicate with the gas passage 211. That is, the inlet hole 264 may be configured to communicate with the gas passages 211 located on both left and right sides based on the cell assembly 100. An inlet hole 264 may be provided at the rear cover 250 located at the rear side of each of the at least two battery modules 200 so that the fire extinguishing agent is introduced therethrough. The inlet hole 264 may be positioned to communicate with the gas passage 211. That is, the inlet hole 264 may be configured to communicate with the gas passages 211 located on both left and right sides based on the cell assembly 100.

Referring to FIG. 5 again to along with FIGS. 1 to 3, the first fire extinguishing unit 301 may include a first fire detection sensor 311, a first fire extinguishing tank 321, a first pipe 330, and a first valve 343.

In addition, the first fire detection sensor 311 may be configured to detect that a temperature of the at least one battery module 200 rises over a predetermined temperature or smoke is generated at the at least one battery module 200.

Specifically, the first fire detection sensor 311 may include a temperature sensor and a smoke sensor (not shown). The temperature sensor may be a linear temperature sensor 360.

For example, the linear temperature sensor 360 may be configured to emit a fire or overheat signal since heat sensing materials coated on two wires are melted when reaching a temperature higher than a reference temperature to cause a short circuit between two wires. For example, the heat sensing material may be a thermoplastic resin that melts at 70° C. to 100° C. For example, the thermoplastic resin may be a polyester resin or an acrylic resin. Additionally, the linear temperature sensor 360 may further include an insulating coating material configured to surround the heat sensing material. The coating material may include polyvinyl chloride.

In addition, the linear temperature sensor 360 may have a structure extending linearly along at least two battery modules 200 arranged in one direction. For example, as shown in FIG. 2, the battery pack 400 may include eight battery modules 200 arranged in a vertical direction. The linear temperature sensor 360 may be configured so that one end thereof is connected to the first controller 351 and extends along the eight battery modules 200 arranged in the vertical direction, and the other end thereof is connected to a resistor 365 at a distal end. At this time, a bracket (not shown) and a fixing buckle (not shown) may be used to partially fix the position of the linear temperature sensor 360.

Therefore, according to this configuration of the present disclosure, since the first fire detection sensor 311 includes the linear temperature sensor 360 along the at least two battery modules 200, it is possible to reduce the manufacturing cost of the battery pack 400.

That is, when a plurality of temperature sensors is applied in the prior art, a plurality of temperature sensors and separate signal wires for connecting the plurality of temperature sensors are required, which increases the manufacturing cost due to high material cost and long installation work. Meanwhile, the battery pack 400 of the present disclosure uses only one linear temperature sensor 360 to detect the temperature of the plurality of battery modules 200, so a separate signal wire is not required and easy installation is secured due to a light and flexible design. Thus, the manufacturing cost of battery pack 400 may be greatly reduced.

Moreover, the linear temperature sensor 360 is useful for setting a plurality of points for more accurate temperature sensing even for one battery module 200. Accordingly, in the present disclosure, it is possible to greatly reduce the failure rate in detecting the occurrence of fire in the battery module 200.

In addition, the smoke sensor may be located at an uppermost portion of the at least two battery modules 200 stacked in the vertical direction. That is, if a fire occurs in the battery module 200, the generated gas may be moved upward, so it is preferable that the smoke sensor is located at the uppermost portion of the at least two battery modules 200.

In addition, the smoke sensor may be configured to transmit a signal to the first controller 351 of the first fire extinguishing unit 301 when detecting smoke. Here, the smoke sensor may employ a generally known technology.

In addition, the first fire extinguishing tank 321 may contain a fire extinguishing agent (not shown) therein. For example, the fire extinguishing agent may be a concentrated solution of an inorganic salt such as potassium carbonate, a chemical bubble, an air bubble, carbon dioxide, or water. In addition, the first fire extinguishing tank 321 may have a compressed gas therein to inject or move the fire extinguishing agent at an appropriate pressure along the first pipe 330.

For example, the capacity of the first fire extinguishing tank 321 may be 59 L, the compressed gas may be nitrogen of 8 bar, and the fire extinguishing agent may be 40 L of water. Here, if the fire extinguishing agent is water, when the fire extinguishing agent is sprayed into the battery module 200, the fire extinguishing agent has a heat shielding effect together with the fire extinguishing and cooling effect, so it is effective in preventing thermal propagation when high-temperature gas and flame are generated due to thermal runaway. As a result, it is possible to effectively prevent a fire or thermal runaway from propagating among the plurality of battery modules 200.

In addition, the first pipe 330 may be configured to be connected to supply the fire extinguishing agent from the first fire extinguishing tank 321 to each of the at least two battery modules 200. For example, the first pipe 330 may be made of a material that is not corroded by water. For example, the first pipe 330 may be made of stainless steel. One end of the first pipe 330 may be connected to an outlet hole 321a of the first fire extinguishing tank 321. The other end of the first pipe 330 may have a shape extending to the inside of each of the at least two battery modules 200.

For example, the first pipe 330 may include a common pipe 333 connected to the outlet hole 321a of the first fire extinguishing tank 320 through which the fire extinguishing agent is discharged, and a distribution pipe 336 having a distributed structure to be connected to each of the at least two battery modules 200 from the common pipe 333. For example, as shown in FIG. 2, the first pipe 330 may include one common pipe 333 connected to the outlet hole 321a of the first fire extinguishing tank 320, and eight distribution pipes 336 branched from the common pipe 333. In addition, the eight distribution pipes 336 may be configured to be connected to eight battery modules 200.

Moreover, the first valve 343 may be configured to supply the fire extinguishing agent from the first fire extinguishing tank 321 into the battery module 200 when an internal gas (air) of the battery module 200 is heated over a predetermined temperature. That is, the first valve 343 may include a passive valve (not shown) configured to open an output hole so that the fire extinguishing agent may be injected into the battery module 200 over the predetermined temperature. For example, when the internal temperature of the battery module 200 is over the predetermined temperature, the passive valve may be partially deformed to open the output hole. Moreover, the passive valve may be configured such that its inner configuration is partially deformed by the heat of the heated internal gas to open the output hole. Here, the 'predetermined temperature' may be, for example, 100° C. or higher.

Meanwhile, the second fire extinguishing unit 302 may include a second fire detection sensor 313, a fire extinguishing agent supply unit 325, and a second valve 348.

First, the second fire detection sensor 313 may be configured to detect that the temperature of the at least one battery module 200 rises over the predetermined temperature or smoke is generated at the at least one battery module 200.

Specifically, the second fire detection sensor 313 may include a temperature sensor and a smoke sensor. The temperature sensor may be a linear temperature sensor 360. The linear temperature sensor 360 may have the same configuration as the linear temperature sensor 360 of the first fire extinguishing unit 301. The linear temperature sensor 360 may be configured to contact the battery module 200. In addition, since the linear temperature sensor 360 has the same configuration as the linear temperature sensor of the first fire extinguishing unit 301, it will not be described in detail.

In addition, the smoke sensor may be configured to detect smoke emitted from the at least two battery modules 200. In addition, the smoke sensor may have the same configuration as the smoke sensor of the first fire extinguishing unit 301.

In addition, the fire extinguishing agent supply unit 325 may be configured to supply the fire extinguishing agent to the first pipe 330 through the second pipe 338. The fire extinguishing agent supply unit 325 may be connected to the other end of the second pipe 338.

Figure 6:
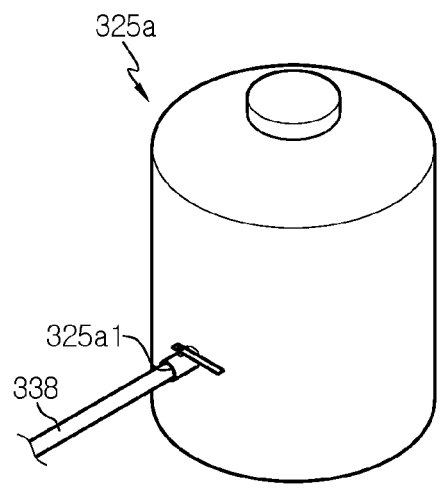
FIG. 6 is a perspective view schematically showing a second fire extinguishing tank, employed at the battery pack according to an embodiment of the present disclosure.

FIG. 6 is a perspective view schematically showing a second fire extinguishing tank, employed at the battery pack according to an embodiment of the present disclosure.

Referring to FIG. 6 along with FIG. 5, the second pipe 338 may be configured to have one end connected to the first pipe 330. For example, the second pipe 338 may be made of a material that is not corroded by water. For example, the second pipe 338 may be made of stainless steel. The second pipe 338 may be configured to have one end connected to an outlet 325a1 of a second fire extinguishing tank 325a. The second pipe 338 may have the other end connected to the first pipe 330 extending to the inside of each of the at least two battery modules 200.

Therefore, according to this configuration of the present disclosure, since the battery pack 400 of the present disclosure further includes the second fire extinguishing unit 302 separately from the first fire extinguishing unit 301, even though the fire of the battery module 200 is not extinguished through the first fire extinguishing unit 301 due to a failure or malfunction of the first fire extinguishing unit 301, the fire may be extinguished additionally using the separate second fire extinguishing unit 302. Accordingly, the battery module 200 of the present disclosure may maximize safety through double fire extinguishing.

Meanwhile, referring to FIG. 6 again along with FIG. 5, the fire extinguishing agent supply unit 325 may include the second fire extinguishing tank 325a. Specifically, the second fire extinguishing tank 325a may contain a fire extinguishing agent (not shown) therein. For example, the fire extinguishing agent may be a concentrated solution of an inorganic salt such as potassium carbonate, a chemical bubble, an air bubble, carbon dioxide, or water. In addition, the second fire extinguishing tank 325a may spray the fire extinguishing agent at an appropriate pressure.

For example, the capacity of the second fire extinguishing tank 325a may be 1000 liters. The second fire extinguishing tank 325a may be placed higher than the battery module 200. That is, the second fire extinguishing tank 325a may send the fire extinguishing agent contained therein to the battery module 200 using potential energy. The fire extinguishing agent may be water. Here, if water is used as the fire extinguishing agent, when the water is sprayed inside the battery module 200, the water has a heat shielding effect together with the fire extinguishing and cooling effect, so it is effective in preventing thermal propagation when high-temperature gas and flame are generated due to thermal runaway. As a result, it is possible to effectively prevent a fire or thermal runaway from propagating among the plurality of battery modules 200.

Therefore, according to this configuration of the present disclosure, since the fire extinguishing agent supply unit 325 includes the second fire extinguishing tank 325a containing the fire extinguishing agent therein, the second fire extinguishing tank 325a may supply the fire extinguishing agent in a higher capacity to the battery module 200, thereby preventing that the fire is not extinguished due to a lack of the fire extinguishing agent.

Figure 7:
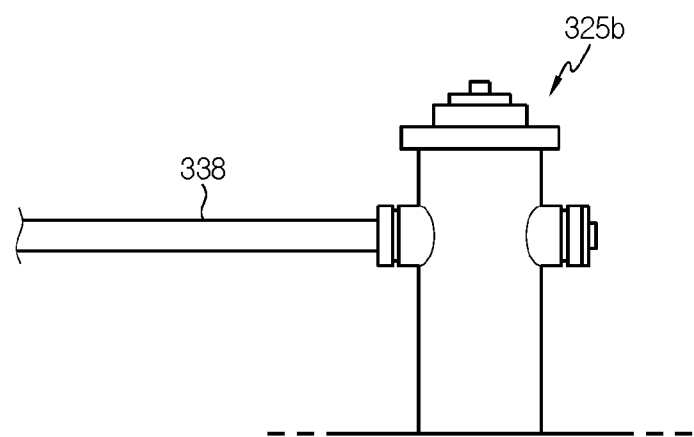
FIG. 7 is a perspective view schematically showing a fire plug, employed at a battery pack according to another embodiment of the present disclosure.

FIG. 7 is a perspective view schematically showing a fire plug, employed at a battery pack according to another embodiment of the present disclosure.

Referring to FIG. 7 along with FIG. 5, the fire extinguishing agent supply unit 325 according to another embodiment of the present disclosure may include a fire plug 325b configured to supply tap water from the outside. An output hole of the fire plug 325b may be configured to be connected to the other end of the second pipe 338.

As in the embodiment of FIG. 6, since the fire extinguishing agent supply unit 325 according to another embodiment of the present disclosure has the fire plug 325b instead of the fire extinguishing tank, it is economical due to low maintenance cost, compared to the second fire extinguishing tank.

Meanwhile, referring to FIGS. 1 to 5 again, the first fire extinguishing unit 301 may include a first control unit 351. The first control unit 351 may be configured to control the first valve 343 to be opened or closed according to a signal received from the first fire detection sensor 311.

Specifically, the first control unit 351 may be configured to open the first valve 343 when a temperature higher than a predetermined temperature is detected by the first fire detection sensor 311. For example, the first control unit 351 may be configured to transmit a signal that controls the first valve 343. For example, the first fire detection sensor 311 may be connected to the first control unit 351 by using a wire capable of transmitting and receiving an electrical signal to/from the first control unit 351.

Meanwhile, referring to FIGS. 1 to 5 again, the second fire extinguishing unit 302 may include a second control unit 355. The second control unit 355 may be configured to control the second valve 348 to be opened or closed according to a signal received from the second fire detection sensor 313.

Specifically, the second control unit 355 may be configured to open the second valve 348 when a temperature higher than a predetermined temperature is detected by the second fire detection sensor 313. For example, the second control unit 355 may be configured to transmit a signal that controls the second valve 348. For example, the second fire detection sensor 313 may be connected to the second control unit 355 by using a wire capable of transmitting and receiving an electrical signal to/from the second control unit 355.

For example, the first control unit 351 may be configured to transmit a fire signal to the second control unit 355, when receiving the fire signal from the first fire detection sensor 311 since the first fire detection sensor 311 detects that the temperature of the battery module 200 is over a predetermined temperature or detects smoke.

In addition, the second control unit 355 may be configured to open the second valve 348 if the second fire detection sensor 313 detects that the battery module 200 is kept over the predetermined temperature even though a predetermined time passes elapses after receiving the fire signal from the first control unit 351. For example, the predetermined time may be 10 minutes. In addition, the predetermined temperature may be 200° C. or higher.

Further, the second control unit 355 may include a switch 355a configured to allow a user to manually open the second valve 348 directly. That is, if the switch 355a is turned on, the second control unit 355 may open the second valve 348 to supply the fire extinguishing agent to the battery module 200 where fire occurs.

Therefore, according to this configuration of the present disclosure, since the first fire extinguishing unit 301 further includes a first control unit 351 configured to control the first valve 343 to be opened or closed according to a signal received from the first fire detection sensor 311 and the second fire extinguishing unit 302 further includes a second control unit 355 configured to control the second valve 348 to be opened or closed according to a signal received from the second fire detection sensor 313, when a fire or thermal runaway occurs at the battery module 200, even though the first valve 343 cannot be opened or closed due to a malfunction or failure of the first control unit 351, the second control unit 355 may open the second valve 348, thereby securing reliable fire extinguishing.

Meanwhile, referring to FIGS. 1 to 5 again, the first pipe 330 may include a common pipe 333 and a distribution pipe 336.

Specifically, the common pipe 333 may be connected to the outlet hole 321a of the first fire extinguishing tank 321 through which the fire extinguishing agent is discharged. In addition, the distribution pipe 336 may have a distributed structure so as to be connected to each of the at least two battery modules 200 from the common pipe 333. For example, as shown in FIG. 2, the first pipe 330 may include one common pipe 333 connected to the outlet hole 321a of the first fire extinguishing tank 321, and eight distribution pipes 336 branched from the common pipe 333. In addition, the eight distribution pipes 336 may be configured to be connected to eight battery modules 200.

Specifically, the first valve 343 may be located at any portion of the common pipe 333 to open and close the common pipe 333. For example, as shown in FIG. 1, the first valve 343 may be configured to connect the common pipe 333 and the first fire extinguishing tank 321 to each other. That is, the first valve 343 may be installed at a start end of the common pipe 333.

In addition, the first valve 343 may be an active valve that is controlled to be opened or closed by the first control unit 351. More specifically, the active valve may be, for example, a control valve, an electric valve, a solenoid valve, or a pneumatic valve.

Moreover, the active valve 343 may be configured to supply the fire extinguishing agent from the first fire extinguishing tank 321 to the battery module 200 whose internal temperature has risen over the predetermined temperature. The active valve 343 may be configured to be actively opened by the first control unit 351 when the first control unit 351 senses that the internal temperature of the battery module 200 rises over the predetermined temperature. In this case, the first control unit 351 may be located on the battery module 200 provided at an uppermost side among the plurality of battery modules 200.

Therefore, according to this configuration of the present disclosure, since the battery pack 400 of the present disclosure includes the first valve 343 provided as an active valve that is controlled to be opened or closed by the first control unit 351, when a fire or thermal runaway occurs at the battery pack 400, it is possible to construct an unmanned system capable of carrying out fire extinguishing. Accordingly, it is possible to secure faster fire extinguishing capacity and reduced maintenance cost.

Figure 8:
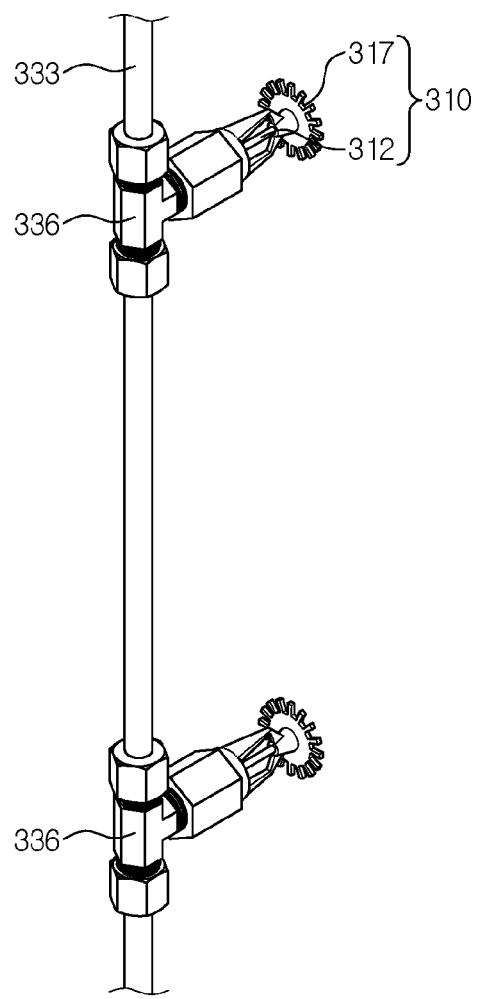
FIG. 8 is a perspective view schematically showing some components of a first fire extinguishing unit, employed at the battery pack according to an embodiment of the present disclosure.

FIG. 8 is a perspective view schematically showing some components of a first fire extinguishing unit, employed at the battery pack according to an embodiment of the present disclosure. Here, FIG. 8 depicts the common pipe 333, the distribution pipe 336, and the distribution valve 310 provided at an end of the distribution pipe 336.

Referring to FIG. 8 along with FIG. 3, the first fire extinguishing unit 301 may further include a distribution valve 310 located at any portion of the distribution pipe 336 to open and close the distribution pipe 336. The distribution valve 310 may include a glass bulb 312 serving as an internal component thereof, which is located at a portion of the gas passage 211 inside the module housing 210. For example, as shown in FIG. 8, the distribution valve 310 may be disposed to protrude toward the battery module 200. At least a portion of the distribution valve 310 may be inserted into the module housing 210 from the rear of the battery module 200. For example, as shown in FIG. 8, the glass bulb 312 and the dispersion unit 317 of the distribution valve 310 may be inserted through the inlet hole 264 so as to be positioned at the rear end of the gas passage 211.

In addition, the distribution valve 310 may be a passive valve. For example, if the internal temperature of the battery module 200 is over the predetermined temperature, the passive valve may be configured to deform some configuration thereof to open the output hole. Moreover, the passive valve may be configured to open the output hole by partially deforming the internal structure thereof by the heat of the internal gas whose temperature has risen. Here, the 'predetermined temperature' may be, for example, 100° C. or higher.

Specifically, the distribution valve 310 may be inserted into the module housing 210. At this time, the fire extinguishing agent provided at the rear end of the gas passage 211 moves to the front of the gas passage 211, and a part of the fire extinguishing agent moves to pass through the cell assembly 100.

Therefore, according to this configuration of the present disclosure, since the distribution valve 310 of the present disclosure is provided as a passive valve configured to open the output hole by deforming some internal configuration thereof when the temperature of the battery module 200 rises over the predetermined temperature, it is possible to respond to a temperature change without separately controlling the valve of the first control unit 351, thereby securing rapid extinguishing ability against thermal runaway or fire of the battery module 200. That is, even if the battery management system malfunctions, thermal runaway or fire may be stably extinguished achieved by the fire extinguishing valve without controlling the BMS, thereby effectively increasing the safety of the battery pack 400.

Figure 9:
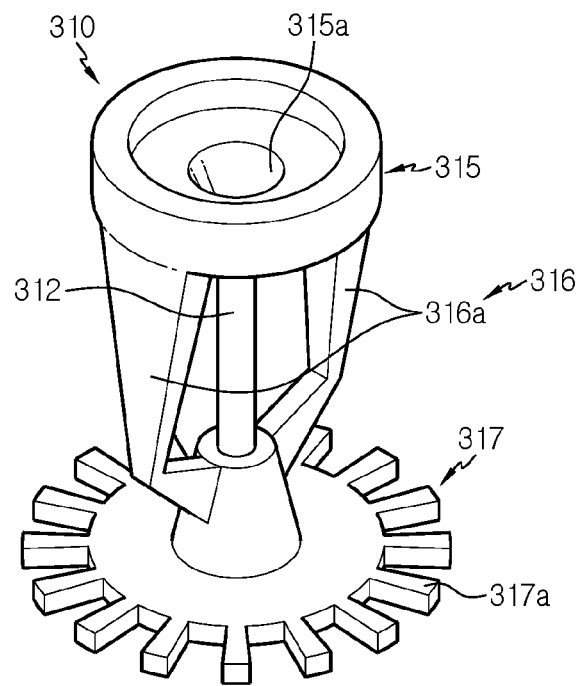
FIG. 9 is a perspective view schematically showing a distribution valve, employed at the battery pack according to an embodiment of the present disclosure.

FIG. 9 is a perspective view schematically showing a distribution valve, employed at the battery pack according to an embodiment of the present disclosure.

Referring to FIG. 9 along with FIGS. 3 and 8, the distribution valve 310 may include a glass bulb 312 configured to seal the output hole 315a at ordinary time, but configured to open the output hole 315a by being partially broken when being exposed to the internal gas of the battery module 200 over the predetermined temperature.

In addition, the glass bulb 312 may have a predetermined liquid (not shown) contained therein. For example, the liquid may have a property that the volume increases as the temperature rises. The glass bulb 312 may be configured to seal a passage (output hole) through which the fluid of the fire extinguishing valve 310 flows.

In addition, the glass bulb 312 may be configured to be broken due to volume expansion of the predetermined liquid at a predetermined temperature, for example, 70° C. to 100° C. or above. For example, the liquid may be water. That is, if the distribution valve 310 is located inside the battery module 200, when the internal temperature of the battery module 200 rises over the predetermined temperature, the glass bulb 312 closing the passage through which the fire extinguishing agent of the distribution valve 310 flows may be at least partially broken to open the output hole 315a of the distribution valve 310. Moreover, the distribution valve 310 may further include a dispersion unit 317 configured to disperse the fire extinguishing agent discharged from the output hole 315a in all directions. The dispersion unit 317 may be configured to disperse the fire extinguishing agent discharged from the output hole 315a.

More specifically, the distribution valve 310 may include a top portion 315 and a connection portion 316.

The top portion 315 may have a tubular shape configured such that the output hole 315a of the valve is formed therein and the output hole 315a is sealed by one end of the glass bulb 312. In this case, the tubular shape may have a pipe diameter continuously decreasing toward the glass bulb 312.

The connection portion 316 may extend from the top portion 315 to the side of the glass bulb 312 to cover the glass bulb 312, and two arms 316a of the connection portion 316 may extend in one direction from the top portion 315 and be gathered to the center again to fix the other end of the glass bulb 312. At this time, the other end of the glass bulb 312 may be located in a portion where the two arms of the connection portion 316 are gathered.

Further, the dispersion unit 317 may include a distributing protrusion 317a. The distributing protrusion 317a may have a shape that is divided into a plurality of parts from the end of the body of the dispersion unit 317 to extend horizontally at regular intervals so that the fire extinguishing agent discharged from the output hole 315a is dispersed.

Therefore, according to this configuration of the present disclosure, since the distribution valve 310 of the present disclosure includes a glass bulb 312 configured to seal the output hole 315a, but configured to open the output hole 315a as being partially broken when being exposed to the internal gas of the battery module 200 over the predetermined temperature, and a dispersion unit 317 configured to disperse the fire extinguishing agent discharged from the output hole 315a, it is possible to open the distribution valve 310 at a response speed by the high internal temperature of the battery module 200 at which thermal runaway or fire occurs. Moreover, since the dispersion unit 317 evenly sprays the supplied fire extinguishing agent, the extinguishing ability may be effectively increased.

Figure 10:
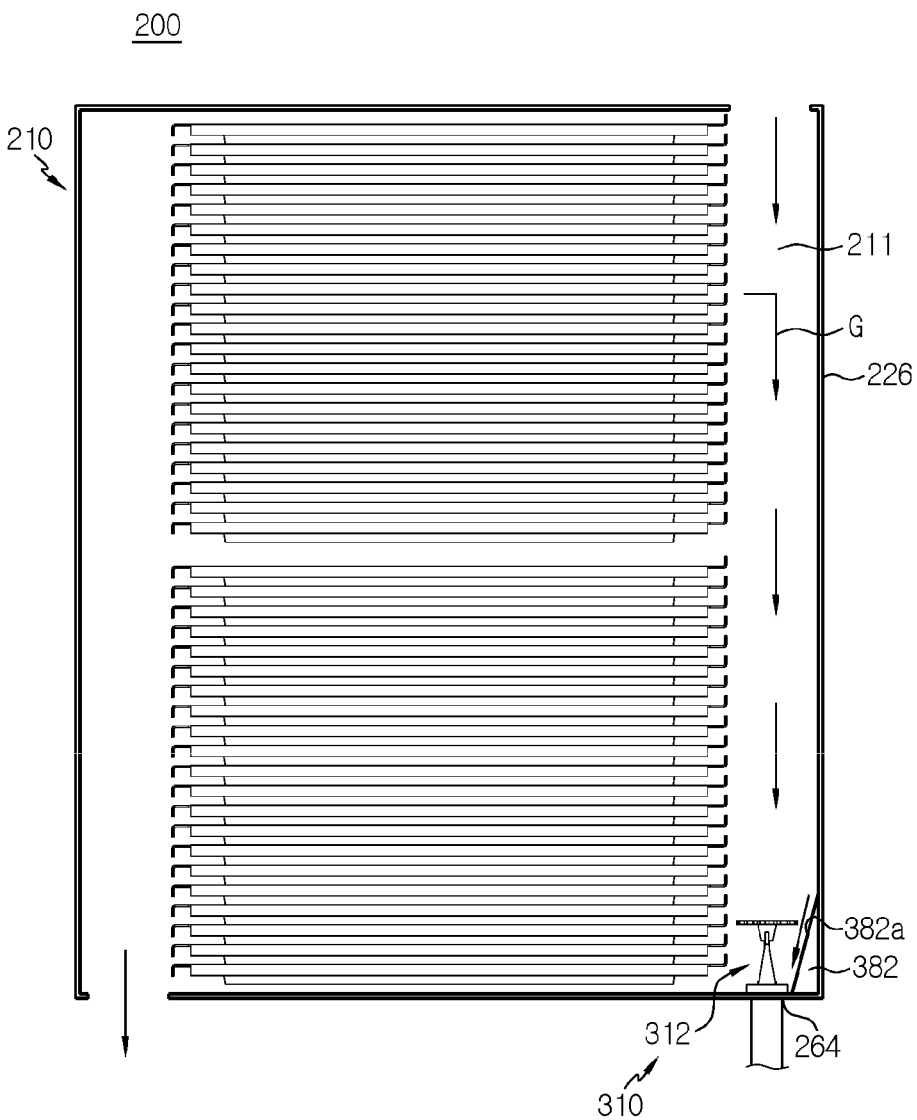
FIG. 10 is a plan view schematically showing inner components of the battery pack according to an embodiment of the present disclosure.

FIG. 10 is a plan view schematically showing inner components of the battery pack according to an embodiment of the present disclosure.

Referring to FIG. 10 along with FIGS. 2 and 8, the distribution valve 310 may be configured such that the glass bulb 312 is positioned at a portion of the gas passage 211 formed between the cell assembly 100 and the sidewall 226 of the module housing 210.

For example, the distribution valve 310 may be inserted into the inlet hole 264 and located in a part of the gas passage 211 so that the glass bulb 312 is exposed to the gas generated from the cell assembly 100.

That is, since the inlet hole 264 is in communication with the gas passage 211, the glass bulb 312 of distribution valve 310 may be inserted into the inlet hole 264 so as to be exposed to the gas generated from the cell assembly 100.

Accordingly, according to this configuration of the present disclosure, since at least a part of the distribution valve 310 is located in a part of a gas passage 211 so that the glass bulb 312 is exposed to the gas generated from the cell assembly 100, when a thermal runaway or fire occurs at the cell assembly 100, it is possible to effectively receive heat transfer from the high-temperature air or gas moving along the gas passage 211, so that the glass bulb 312 of the distribution valve 310 bursts quickly to take a fire extinguishing action fast.

Meanwhile, the module housing 210 may further include a guide block 382 therein. The guide block 382 may have an inclined surface 382a that guides the gas G generated from the cell assembly 100 to flow while facing the exposed portion of the glass bulb 312. For example, the guide block 382 may have a triangular shape on a plane. For example, as shown in FIG. 10, the high-temperature gas G flowing from the front to the rear of the gas passage 211 may flow along the inclined surface 382a of the guide block 382, so that the flow of the gas G is guided toward the glass bulb 312 of the distribution valve 310.

Therefore, according to this configuration of the present disclosure, since the battery module 200 includes the guide block 382 having the inclined surface 382a that guides the gas G generated from the cell assembly 100 to flow while facing the exposed portion of the glass bulb 312, it is possible to effectively reduce that the contact of the glass bulb 312 of the distribution valve 310 with the high-temperature gas G is disturbed. Accordingly, the distribution valve 310 may operate with high reliability, and the operating time may be effectively reduced.

Figure 11:
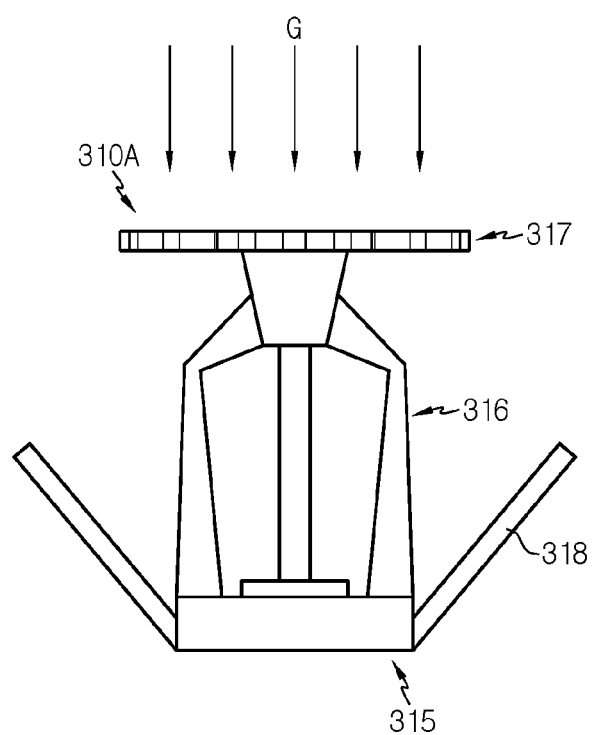
FIG. 11 is a plan view schematically showing a distribution valve, employed at a battery pack according to another embodiment of the present disclosure.

FIG. 11 is a plan view schematically showing a distribution valve, employed at the battery pack according to another embodiment of the present disclosure.

Referring to FIG. 1, a distribution valve 310A according to still another embodiment of the present disclosure may further include a gas guide 318, when compared with the distribution valve 310 shown in FIG. 9.

That is, the distribution valve 310A shown in FIG. 11 is the same as the distribution valve 310 shown in FIG. 9, except for the gas guide 318. Therefore, the top portion 315, the connection portion 316 and the dispersion unit 317, already described above will not be described again in detail.

In addition, the gas guide 318 may be configured such that a larger amount of high-temperature gas G comes into contact with the glass bulb 312. The gas guide 318 may be shaped to extend from the top portion 315 toward the dispersion unit 317. The gas guide 318 may have a structure that is widened in at least two of left, right, upper and lower directions. For example, as shown in FIG. 11, the gas guide 318 may extend from the left and right sides of the top portion 315 toward the dispersing protrusion 317a. The gas guide 318 may have a structure that is widened from the top portion 315 in the left, right, upper and lower directions.

Therefore, according to this configuration of the present disclosure, since the dispersion unit 314A of the distribution valve 310A according to the present disclosure includes the gas guide 318 extending from the top portion 315 toward the dispersion unit 317 and having a structure that is widened in at least two of left, right, upper and lower directions, the high-temperature gas G flowing to both sides of the glass bulb 312 may be guided to flow toward the glass bulb 312 without passing directly. Accordingly, the distribution valve 310A may operate with high reliability, and the operating time of the distribution valve 310A may be effectively reduced.

FIG. 12 is a front view schematically showing an energy storage system according to an embodiment of the present disclosure.

Referring to FIG. 12 along with FIG. 1, a battery rack 500 according to an embodiment of the present disclosure may include at least one battery module 200 and a battery pack 400 having a pack BMS 350. The pack BMS 350 may be located above the battery module 200 that is located at a top end T among the plurality of battery modules 200.

In addition, the battery rack 500 may further include other components such as a battery management system (BMS) inside or outside the rack case 510.

The rack case 510 may also be configured to accommodate the plurality of battery modules 200 of the battery pack 400 to be vertically stacked. Inside the rack case 510, the battery module 200 may be mounted such that its lower surface is in a parallel shape to the horizontal surface.

Here, the horizontal direction may refer to a direction parallel to the ground when the battery module 200 is placed on the ground, and may also refer to at least one direction on a plane perpendicular to the vertical direction.

Moreover, the rack case 510 is configured to have at least one side openable, and the battery module 200 may be inserted into the inner space through the open side. However, the rack case 510 may also be configured to allow such an open side to be closed.

Meanwhile, an energy storage system 600 according to an embodiment of the present disclosure may include two or more battery racks 500. The two or more battery racks 500 may be arranged in one direction. For example, as shown in FIG. 12, the energy storage system 600 may be configured such that three battery racks 500 are arranged in one direction. In addition, the energy storage system 600 may have a separate central controller (not shown) capable of controlling charging and discharging of three battery racks 500.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 200: battery module | 100: cell assembly |
| 110: secondary battery | 210: module housing |
| 211: gas passage | 212: gas discharge hole |
| 264: inlet hole | |
| 301, 302: first fire extinguishing unit, second fire extinguishing unit | |
| 311, 313: first fire detection sensor, second fire detection sensor | |
| 343, 348, 310: first valve, second valve, distribution valve | |
| 321: first fire extinguishing tank | 321a: outlet hole |
| 325, 325a, 325b: fire extinguishing agent supply unit, second fire extinguishing tank, fire plug | |
| 330, 333, 336: first pipe, common pipe, distribution pipe | |
| 338: second pipe | |
| 312: glass bulb | 317: dispersion unit |
| 315, 316, 317: top portion, connection portion, dispersion unit | |
| 382: guide block | 318: gas guide |
| 351, 355: first control unit, second control unit | |

| Reference Signs | |
|---|---|
| 400: battery pack | 500: battery rack |
| 510: rack case | |
| 600: energy storage system | |

What is claimed is:

1. A battery pack, comprising:
   at least one battery module;
   a first fire extinguisher including:
      a first fire detection sensor configured to detect that a temperature of the at least one battery module rises over a first predetermined temperature or smoke is generated at the at least one battery module,
      a first fire extinguishing tank configured to accommodate a first fire extinguishing agent therein,
      a first pipe configured to connect the first fire extinguishing tank and the at least one battery module so that the fire extinguishing agent is supplied from the first fire extinguishing tank to the at least one battery module, and
      a first valve provided to the first pipe and configured to be opened to supply the fire extinguishing agent from the first fire extinguishing tank to the at least one battery module when the temperature of the at least one battery module rises over the first predetermined temperature or smoke is generated at the at least one battery module; and
   a second fire extinguisher including:
      a second fire detection sensor configured to detect that the temperature of the at least one battery module rises over a second predetermined temperature or smoke is generated at the at least one battery module,
      a second pipe having a first end connected to the first pipe,
      a fire extinguishing agent supplier connected to a second end of the second pipe so that a second fire extinguishing agent is supplied to the first pipe through the second pipe, and
      a second valve configured to be opened to supply the second fire extinguishing agent from the fire extinguishing agent supplier to the first pipe through the second pipe when the temperature of the at least one battery module rises over the second predetermined temperature or smoke is generated at the at least one battery module,
   wherein the first pipe independently receives the fire extinguishing agent from the first fire extinguishing tank or the fire extinguishing agent supplier,
   wherein the first fire extinguisher further includes a first control unit configured to control the first valve to be opened or closed according to a signal received from the first fire detection sensor,
   wherein the second fire extinguisher further includes a second control unit configured to control the second valve to be opened or closed according to a signal received from the second fire detection sensor,
   wherein the first control unit transmits a fire signal to the second control unit, when receiving the fire signal from the first fire detection sensor, and
   wherein the second control unit is configured to open the second valve, when the second fire detection sensor detects that the battery module is kept over the first predetermined temperature even though a predetermined time passes after receiving the fire signal from the first control unit.

2. The battery pack according to claim 1, wherein the fire extinguishing agent supplier includes a second fire extinguishing tank configured to accommodate the second fire extinguishing agent therein, or a fire plug connected to the second pipe and configured to supply water from the outside, or both of the second fire extinguishing tank and the fire plug.

3. The battery pack according to claim 1, wherein the at least one battery module comprises at least two battery modules, and
   wherein the first pipe includes:
      a common pipe connected to an outlet hole of the first fire extinguishing tank through which the first fire extinguishing agent is discharged; and
      a distribution pipe having a distributed structure connected to each of the at least two battery modules from the common pipe,
   wherein the first valve is located at a portion of the common pipe to open or close the common pipe, and
   wherein the first valve is an active valve controlled to be opened or closed by the first control unit.

4. The battery pack according to claim 3, wherein the first fire extinguisher further includes a distribution valve located at a portion of the distribution pipe to open or close the distribution pipe, and
   wherein the distribution valve is a passive valve configured to open an output hole thereof by deforming an inner configuration thereof partially when the temperature of one of the at least two battery modules rises over the first predetermined temperature.

5. The battery pack according to claim 4, wherein the distribution valve includes:
   a glass bulb configured to close the output hole and configured to open the output hole by being at least partially broken when the battery module is exposed to an internal gas over the first predetermined temperature; and
   a disperser configured to disperse the first fire extinguishing agent discharged from the output hole.

6. The battery pack according to claim 5, wherein the battery module includes at least one cell assembly having a plurality of secondary batteries, and a module housing having an inner space capable of accommodating the at least one cell assembly,
   wherein the module housing has a gas passage configured to discharge gas generated from the at least one cell assembly to the outside, and
   wherein the glass bulb of the distribution valve is located at a portion of the gas passage.

7. The battery pack according to claim 6, wherein the distribution valve further includes a gas guide configured to guide gas generated from the at least one cell assembly to come into contact with the glass bulb.

8. A battery rack, comprising:
   the battery pack according to claim 1; and
   a rack case configured to accommodate the battery pack.

9. An energy storage system, comprising at least two battery racks according to claim 8.

10. The battery pack according to claim 1, wherein the second predetermined temperature is higher than the first predetermined temperature.

11. The battery pack according to claim 1, wherein the first pipe includes:

a common pipe connected to an outlet hole of the first fire extinguishing tank through which the first fire extinguishing agent is discharged; and a distribution pipe having a distributed structure connected to the at least one battery module, and wherein the first valve is located at a portion of the common pipe to open or close the common pipe.

12. The battery pack according to claim 1, wherein the fire extinguishing agent supplier comprises a fire plug connected to the second pipe and configured to supply water from the outside.

13. The battery pack according to claim 1, wherein the fire extinguishing agent supplier has a greater capacity than the first fire extinguishing tank.

14. The battery pack according to claim 1, wherein the at least one battery module is a plurality of battery modules.

15. The battery pack according to claim 1, further comprising a controller configured to receive the first signal from the first sensor and actuate the first valve and receive the second signal from the second sensor and actuate the second valve.

* * * * *